(12) United States Patent
Murakami et al.

(10) Patent No.: US 9,826,127 B2
(45) Date of Patent: Nov. 21, 2017

(54) DISPLAY DEVICE AND METHOD OF MANUFACTURING DISPLAY DEVICES

(71) Applicant: Furuno Electric Co., Ltd., Nishinomiya (JP)

(72) Inventors: Kenichi Murakami, Nishinomiya (JP); Daigo Dohi, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 14/857,602

(22) Filed: Sep. 17, 2015

(65) Prior Publication Data

US 2016/0088746 A1 Mar. 24, 2016

(30) Foreign Application Priority Data

Sep. 19, 2014 (JP) .................... 2014-190646

(51) Int. Cl.
| | |
|---|---|
| *H05K 5/00* | (2006.01) |
| *H04N 5/225* | (2006.01) |
| *G06F 1/16* | (2006.01) |
| *F16M 11/00* | (2006.01) |

(52) U.S. Cl.
CPC ............. *H04N 5/225* (2013.01); *F16M 11/00* (2013.01); *G06F 1/1601* (2013.01)

(58) Field of Classification Search
USPC ................ 361/752, 825, 682, 683
See application file for complete search history.

(56) References Cited

U.S. PATENT DOCUMENTS

| | | | |
|---|---|---|---|
| 7,233,486 B2 * | 6/2007 | Kim ...................... | G06F 1/1601 349/58 |
| 2005/0001949 A1 * | 1/2005 | Kawamoto ........... | G06F 1/1605 349/58 |
| 2005/0212982 A1 * | 9/2005 | Soga ....................... | H04N 5/64 348/825 |

FOREIGN PATENT DOCUMENTS

JP        200277677 A     3/2002

* cited by examiner

*Primary Examiner* — Andargie M Aychillhum
(74) *Attorney, Agent, or Firm* — Alleman Hall Creasman & Tuttle LLP

(57) ABSTRACT

A display device is provided. The display device includes a display panel configured to display an image, a display housing having a first attaching face and a second attaching face located on the opposite side from the first attaching face, and configured to cover a part of the display panel attached to the first attaching face, a main control substrate configured to cause the display panel to display the image, a control housing attached to the second attaching face of the display housing to cover at least the main control substrate together with the display housing, and a supporting base attached to the display housing to support the display housing, and the display panel and the control housing attached to the display housing.

8 Claims, 4 Drawing Sheets

DISPLAY DEVICE AND METHOD OF MANUFACTURING DISPLAY DEVICES

CROSS-REFERENCE TO RELATED APPLICATION(S)

This application claims priority under 35 U.S.C. §119 to Japanese Patent Application No. 2014-190646, which was filed on Sep. 19, 2014, the entire disclosure of which is hereby incorporated by reference.

TECHNICAL FIELD

This disclosure generally relates to a display device, which is supported by a supporting base.

BACKGROUND OF THE INVENTION

Conventionally, display devices including a display housing, a control housing, and a supporting base are known. The display housing is a component which covers a display panel (e.g., liquid crystal panel) while exposing the display screen. The control housing is a component attached to a rear surface of the display housing, to cover a substrate where various controls are performed. The supporting base is a component attached to the control housing, to support the display and control housings at a predetermined angle.

To enhance the existing display devices or develop a new type of display device, generally the shape of the substrate is changed or a new component is attached to the substrate due to an additional function. There also is a case where the positional arrangement of the substrate or an external interface is changed. Therefore, the control housing needs to be newly designed for the enhancement/development of the display device.

However, with the conventional display device, since the supporting base is attached to the control housing, the supporting base also needs to be newly designed for the changed shape of the control housing. Moreover, to manufacture newly designed supporting bases, a new mold needs to be fabricated. Additionally, the attaching manner of the supporting base will be different from the conventional manner, and therefore, workers need to remember the new manner, which becomes troublesome to the workers.

In this regard, JP2002-077677A discloses a digital camera having a configuration with which even if the size of a liquid crystal panel of the digital camera is changed, by using a liquid crystal panel holder for the liquid crystal panel, a change of an exterior panel of the digital camera is not required. However, since JP2002-077677A discloses the art for digital cameras, a supporting base is not described nor mentioned.

SUMMARY OF THE INVENTION

The purpose of this disclosure relates to providing a display device including a control housing and a supporting base, which is suppressed in cost increase on the supporting base even when a shape of the control housing is changed.

According to one aspect of this disclosure, a display device with the following configuration is provided. Specifically, the display device includes a display panel configured to display an image, a display housing having a first attaching face and a second attaching face located on the opposite side from the first attaching face, and configured to cover a part of the display panel attached to the first attaching face, a main control substrate configured to cause the display panel to display the image, a control housing attached to the second attaching face of the display housing to cover at least the main control substrate together with the display housing, and a supporting base attached to the display housing to support the display housing, and the display panel and the control housing attached to the display housing.

Thereby, the supporting base is attached to the display housing, not the control housing. Thus, even if an exterior shape of the control housing is changed due to an enhancement or development of the display device, the same supporting base can be used. Therefore, since the supporting base does not need to be designed newly, the cost for the enhancement or the like of the display device can be suppressed. Moreover, since the attaching operation of the supporting base remains the same even with the enhancement or the like of the display device, load on workers can be reduced compared to the conventional case.

The display device preferably has the following configuration. Specifically, the display housing has projecting parts projecting from the second attaching face to the side opposite from the display panel. Each of the projecting parts is formed with a supporting base attaching portion to which the supporting base is attached.

Thereby, supported positions of the display device can be brought close to its center of gravity, and thus, the display device can stably be supported.

Each of the projecting parts preferably projects from an end part of the second attaching face.

Thereby, even if the control housing covers a major part of the second attaching face, the projecting parts (supporting base attaching portions) can be provided to the second attaching face.

A notched portion through which the projecting part of the display housing is inserted is preferably formed in the control housing to be located at a position in agreement with the projecting part.

Thereby, even though the second attaching face and the control housing have substantially the same size in longitudinal and lateral directions thereof, the projecting parts (supporting base attaching portions) can be formed in the second attaching face.

The display device preferably has the following configuration. Specifically, a display panel substrate is disposed in the display housing. The display panel substrate performs a control regarding hardware of the display panel.

Thereby, the substrate disposed inside the display housing (display panel substrate) does not perform processing regarding the image. Thus, not only the supporting base and the display housing, but also the display panel and the display panel substrate, can still be used when the main control substrate and/or the control housing are enhanced. Therefore, the cost for the enhancement or the like of the display device can be suppressed even more.

A part of the supporting base attached to the display housing is preferably located outside the display housing.

Thereby, the control housing does not interrupt the attaching operation of the supporting base. Thus, the attaching operation can be performed smoothly.

According to another aspect of this disclosure, the following method of manufacturing display devices is provided. Specifically, the method includes attaching a display panel to a first attaching face of a display housing to cover a part of the display panel, attaching a control housing to a second attaching face to cover, with the display housing and the control housing, a main control substrate configured to cause the display panel to display the image, and attaching a supporting base to the display housing to support the display housing, and the display panel and the control housing attached to the display housing. The display panel displays an image. The second attaching face is located on the opposite side from the first attaching face.

Thereby, the supporting base is attached to the display housing, not the control housing. Thus, even if an exterior shape of the control housing is changed due to an enhancement or development of the display device, the cost for the enhancement or the like of the display device can be suppressed.

The display panel and the display housing used in the attaching the display panel, the attaching the main control substrate, and the attaching the supporting base are preferably applicable to a different shape of control housing.

Thereby, in a case where the main control substrate and/or the control housing are enhanced, not only the supporting base, but also the display panel and the display housing, can still be used. Thus, the cost for the enhancement or the like of the display device can be suppressed even more.

BRIEF DESCRIPTION OF THE DRAWING(S)

The present disclosure is illustrated by way of example and not by way of limitation in the figures of the accompanying drawings, in which the like reference numerals indicate like elements and in which.

DETAILED DESCRIPTION

Next, an embodiment of this disclosure is described with reference to the appended drawings. First, a display device 1 of this embodiment is described with reference to FIGS. 1 and 2.

Figure 1:
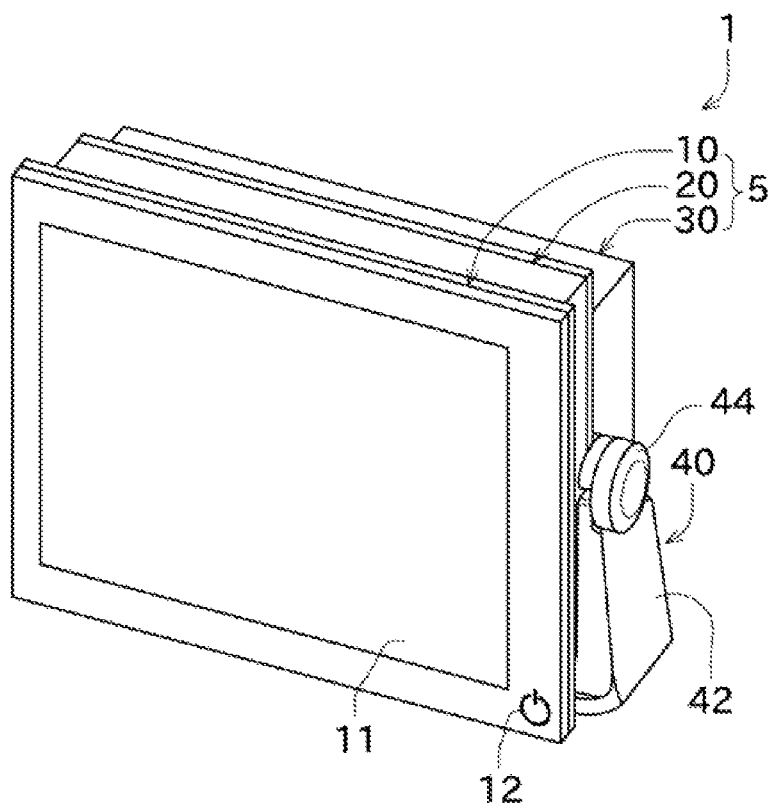
FIG. 1 is a perspective view of a display device according to one embodiment of this disclosure.

The display device 1 is connected with non-illustrated ship instrument(s) (radar apparatus, fish finder, navigation system, etc.), and displays, on a display screen, image(s) generated by the ship instrument(s). As illustrated in FIG. 1, the display device 1 includes a display device body 5, and a supporting base 40 configured to support the display device body 5. The display device body 5 includes a display panel 10, a display housing 20, and a control housing 30.

The display panel 10 has a display screen 11 configured to display the image(s) generated by the ship instrument(s). Further, the display panel 10 is configured as a liquid crystal panel having a touch screen function. Note that, the display panel 10 is not limited to the liquid crystal panel, and may be an organic EL panel or a plasma display panel. The display panel 10 may not have the touch screen function. Moreover, a power source key 12 is disposed near the display screen 11.

Figure 2:
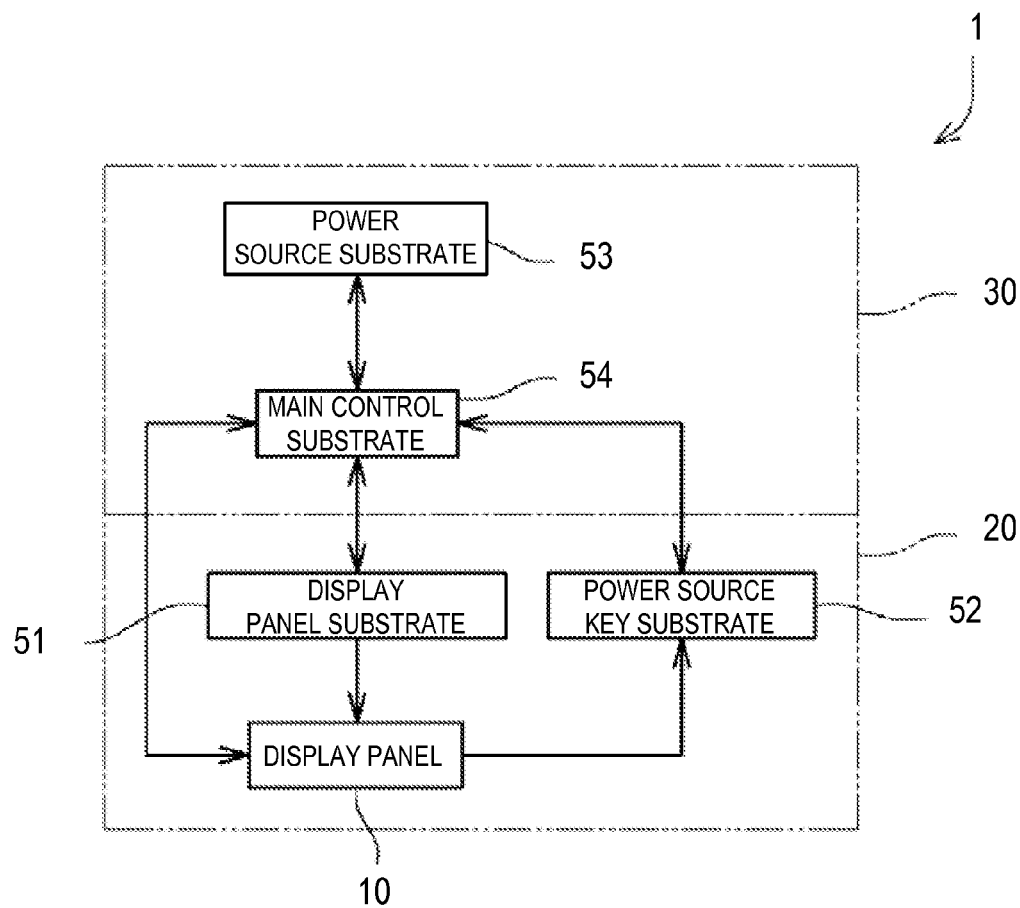
FIG. 2 is a block diagram illustrating an electric configuration of the display device.

As illustrated in FIG. 2, inside the display housing 20, a display panel substrate 51 and a power source key substrate 52 are disposed. The display panel substrate 51 performs a control of the display panel 10, particularly a control of hardware of the display panel 10. Specifically, the display panel substrate 51 performs a control regarding illuminance and on/off of a backlight of the display panel 10, a control of detecting touch operation on the display panel 10, etc. The power source key substrate 52 is detectable of pushing operation on the power source key 12.

Inside the control housing 30, a power source substrate 53 and a main control substrate 54 are disposed. The power source substrate 53 receives power from an external power source. The power source substrate 53 adjusts the power (e.g., voltage of the power) supplied from the external power source and then supplies it to the main control substrate 54. The power supplied to the main control substrate 54 is partially used in the main control substrate 54, and the rest of the power is outputted to the display panel 10, the display panel substrate 51, etc.

The main control substrate 54 is electrically connected with the respective substrates and the display panel 10 constituting the display device 1. The main control substrate 54 receives image signal(s) from the ship instrument(s) described above. The main control substrate 54 includes a memory comprised of a ROM, and a controller comprised of a CPU. The memory stores a display program to display the image(s) on the display screen 11. The controller invokes the display program stored in the memory, for example, at a RAM and executes it to generate the image(s) and cause the display screen 11 to display the image(s). Further, based on operation on the touch screen (display screen 11) by a user, the main control substrate 54 switches the image or divides the image to be displayed and displays it.

Thus, in the display device 1 of this embodiment, controls regarding image display contents are performed by the main control substrate 54, and not by the display panel substrate 51. Further, the display panel substrate 51 only performs the controls regarding the hardware of the display panel 10. Therefore, in this embodiment, if the display device 1 is enhanced to have an additional function as software, the display panel 10, the display panel substrate 51, and the power source key substrate 52 can be used as they are.

Next, a mechanical function and an assembling method of the display device 1 are described with reference to FIGS. 3 and 4.

Figure 3:
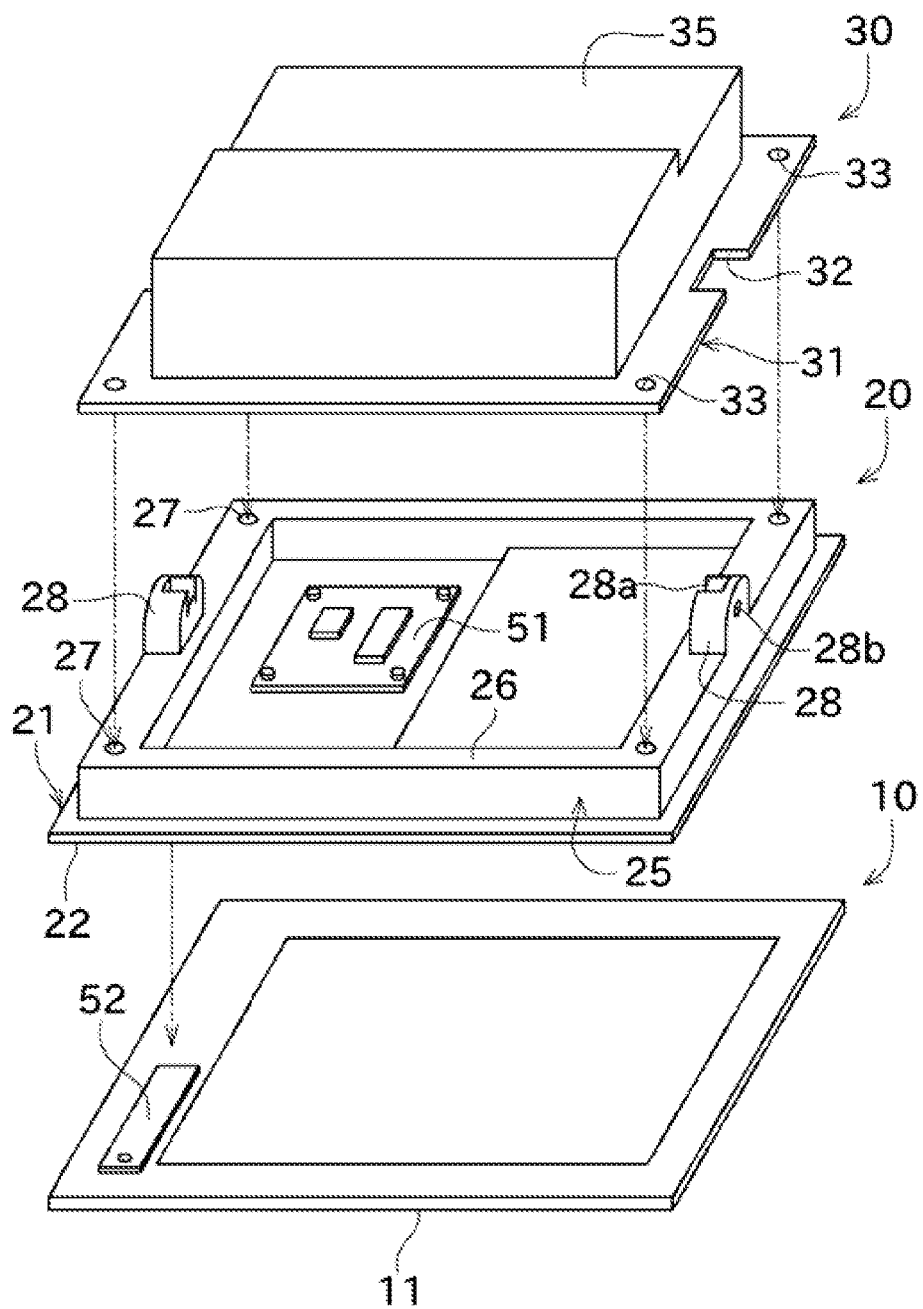
FIG. 3 is a developed perspective view of a display device body.

As illustrated in FIG. 3, in this embodiment, in assembling the display device body 5, the display housing 20 and the control housing 30 are attached to a rear side of the display panel 10 (opposite side from the display screen 11) in this order. Note that, the order of attaching the respective components (housings and substrates) constituting the display device body 5 is arbitrary. For example, the respective substrates, the display housing 20, and the control housing 30 may be attached by being stacked onto the display panel 10 in any suitable order. Further, the order may be as follows: the respective substrates are attached to the display and control housings 20 and 30 first, the display housing 20 is attached to the display panel 10, and then the control housing 30 is attached to the display housing 20.

As illustrated in FIG. 3, the display housing 20 includes a display panel attaching member 21 and a control housing attaching member 25. The display panel attaching member 21 is a front (display screen 11 side) member of the display housing 20. The display panel attaching member 21 has a first attaching face 22. The first attaching face 22 is attached to the display panel 10 by using an adhesive, for example.

The control housing attaching member 25 is a frame-like member projecting to the rear side from the display panel attaching member 21. The control housing attaching member 25 has a second attaching face 26. Note that, the second attaching face 26 is located on a rear side (opposite side from the first attaching face 22) of the control housing attaching member 25. The second attaching face 26 is formed with a plurality of attaching holes 27.

Further, the second attaching face 26 has two projecting parts 28 substantially perpendicular to the second attaching face 26 (to the opposite side from the display panel 10). When longitudinal directions of the display screen 11 (left-and-right directions in FIG. 3) are simply referred to as the "longitudinal directions" and lateral directions of the display screen 11 (substantially up-and-down directions in FIG. 3) are simply referred to as the "lateral directions," the projecting parts 28 are formed at positions corresponding to both end parts of the second attaching face 26 in the longitudinal directions and a central part of the second attaching face 26 in the lateral directions. Each of the two projecting parts 28 is formed with a lightening portion 28a and a supporting base attaching hole 28b (supporting base attaching portions). Each of the lightening portions 28a is formed at an inner (the side closer to the center of the second attaching face 26 in the longitudinal directions) position of a tip portion of the projecting part 28. Each of the supporting base attaching holes 28b is a penetrating hole of which axis is in agreement with the longitudinal directions.

The control housing 30 includes a display housing attaching member 31 and a cover member 35. The display housing attaching member 31 is a flat plate-like front member of the control housing 30 and forms edges of the control housing 30. The display housing attaching member 31 is formed with notched portions 32 at positions corresponding to the projecting parts 28. Specifically, the notched portions 32 are formed at positions corresponding to both end portions of the display housing attaching member 31 in the longitudinal directions and a central part of the display housing attaching member 31 in the lateral directions. Therefore, when the control housing 30 is attached to the display housing 20, the projecting parts 28 pass through the notched portions 32, respectively. Thus, even though the second attaching face 26 and the display housing attaching member 31 have substantially the same size in the longitudinal and lateral directions, the projecting parts 28 can be formed in the second attaching face 26.

Further, the display housing attaching member 31 is formed with a plurality of attaching holes 33. By arranging the attaching holes 33 to be in agreement with the attaching holes 27 and inserting screws into the holes to fasten them together, respectively, the control housing 30 is attached to the display housing 20. Thus, the assembly of the display device body 5 is completed.

The cover member 35 is a box-shaped member formed to project further rearward from the display housing attaching member 31. The cover member 35 has a space therein where the power source substrate 53, the main control substrate 54 and the like are located.

Figure 4:
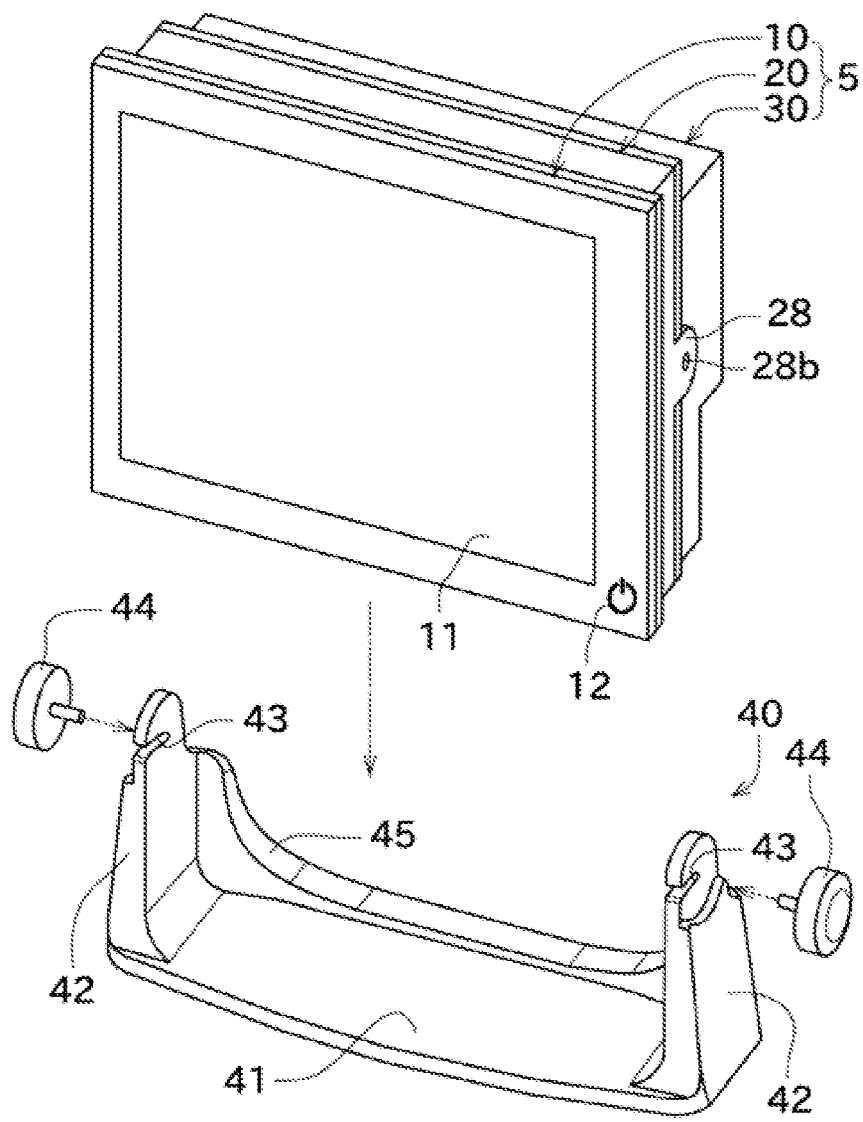
FIG. 4 is a perspective view illustrating a state where the display device body is attached to a supporting base.

Next, as illustrated in FIG. 4, the supporting base 40 is detachably provided to the display device body 5. The supporting base 40 includes a base member 41, a pair of arms 42, and a reinforcing member 45.

The base member 41 is a flat plate-like member placed at a predetermined position while in use of the display device 1. The pair of arms 42 are formed at both end positions of the base member 41 in longitudinal directions thereof to stand substantially perpendicularly from the base member 41.

A base end part of each of the arms 42 is connected with the base member 41, and a tip part (opposite side from the base end part) of each of the arms 42 is formed with a housing attaching recess 43. By arranging the pair of the housing attaching recesses 43 to be in agreement with the pair of supporting base attaching holes 28b of the display housing 20 and inserting attachments 44 (e.g., screws, bolts etc.) into the recesses and the holes to fasten them together, respectively, the display device body 5 is attached to the supporting base 40. In this embodiment, the supporting base 40 supports the display device body 5 by sandwiching the display device body 5 therebetween in the longitudinal directions as described above. Note that, the orientation (tilt angle) of the display device body 5 can be adjusted by loosening the attachments 44, arranging the display device body 5 to a predetermined angle, and fastening the attachments 44 again.

Further, in a state where the attaching is completed (FIG. 1), the arms 42 are located outward of the projecting parts 28. By adopting such an attaching structure, the control housing 30 does not interrupt the attaching operation of the supporting base 40, and therefore, the attaching operation can be performed smoothly.

The reinforcing member 45 is formed to connect the pair of arms 42 with each other on the rear side and has a longer length in a direction perpendicular to the longitudinal directions of the base member 41 as it extends to the arms 42. The reinforcing member 45 is provided to reinforce the arms 42.

With the conventional display device, the supporting base is attached to the control housing, and not the display housing. Therefore, in a case where the shape of the main control substrate or the components to be disposed are changed and the shape of the control housing is changed due to a functional addition or the like, the supporting base needs to be newly designed accordingly.

In this regard, in this embodiment, not the control housing 30, but the display housing 20 is attached to the supporting base 40. Further, since the display panel substrate 51 only performs the controls regarding the hardware of the display panel 10, this embodiment is applicable to various kinds of main control substrates. Therefore, the display panel 10 and the display housing 20 (including the display panel substrate 51, etc. therein) of this embodiment can be attached even to the control housing 30 with a different shape due to an enhancement or the like without any problem. Thus, the cost increase due to the enhancement or the like of the display device 1 can be suppressed.

Note that conventionally, it has been difficult to attach the supporting base in a case where the length (depth) of the display housing in the front-and-rear directions is short. Further, since the control housing generally has a long length in the front-and-rear directions, even if the display housing can be attached to the supporting base, the display device body is supported at a position far from the center of gravity.

In this regard, in this embodiment, since the supporting base 40 is attached to the projecting parts 28 extending rearward from the display housing 20, despite the short length of the display housing 20 in the front-and-rear directions, the display housing 20 can be attached to the supporting base 40 without the disadvantage described above. Moreover, by attaching the projecting parts 28 to the supporting base 40, the supported positions of the display device body 5 can be brought close to its center of gravity, and therefore, the display device body 5 can stably be supported.

As described above, the display device 1 of this embodiment includes the display panel 10, the display housing 20, the main control substrate 54, the control housing 30, and the supporting base 40. The display panel 10 is displayable of the image(s). The display housing 20 has the first attaching face 22 to which the display panel 10 is attached, and the second attaching face 26 located on the opposite side from the first attaching face 22. The display housing 20 covers a part of the display panel 10 attached to the first attaching face 22. The main control substrate 54 performs a control of displaying the image on the display panel 10. The control housing 30 is attached to the second attaching face 26 of the display housing 20 to cover at least the main control substrate 54 together with the display housing 20. The supporting base 40 is attached to the display housing 20 to support the display housing 20, and the display panel 10 and the control housing 30 attached to the display housing 20. In this embodiment, the supporting base 40 is attached only to the display housing 20 and is not attached to the control housing 30.

Since the supporting base 40 is attached to the display housing 20 and is not attached to the control housing 30 as above, even if the exterior shape of the control housing 30 is changed due to an enhancement or development of the display device 1, the same supporting base 40 can be used. Therefore, the cost for the enhancement or the like of the display device 1 can be suppressed. Moreover, since the attaching operation of the supporting base 40 remains the same even with the enhancement or the like of the display device 1, load on workers can be reduced compared to the conventional case.

Although the preferred embodiment of this disclosure is described above, the above configuration may be modified as follows.

The positions of the supporting base attaching holes 28b are arbitrary, and may suitably be changed. In the above embodiment, the supporting base attaching holes 28b are formed in both end parts of the second attaching face 26 in the longitudinal directions; however, the supporting base attaching holes 28b may be formed in both end parts of the second attaching face 26 in the lateral directions. Note that, if the size of the display housing 20 is large, the projecting parts 28, in other words, the supporting base attaching holes 28b may be formed slightly closer to the center of the second attaching face 26, instead of the end parts. Further, the supporting base attaching holes 28b may be formed in a side face of the display housing 20 (face perpendicular to the first and second attaching faces 22 and 26), instead of the projecting parts 28.

The attaching method for the display device body 5 to the supporting base 40 is not limited to that using the attachments 44, and may suitably be changed. For example, metal brackets may be attached to the display housing 20, and the supporting base 40 may be attached to the display housing 20 via the metal brackets. In this case, the positions of the metal attachments are arbitrary, and for example, they may be attached only to a lower (supporting base 40 side) part of the display housing 20 in the lateral directions.

In the above embodiment, the power source substrate 53 and the main control substrate 54 are configured as different substrates; however, a single substrate having both functions may be used.

The application of the display device of this disclosure is not limited to ships, and for example, it is applicable to various instruments, such as navigation systems for other movable bodies and personal computers.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A display device, comprising: a display device body comprising: a display panel configured to display an image; a display housing having a first attaching face and a second attaching face located on the opposite side from the first attaching face, and configured to cover a part of the display panel attached to the first attaching face; a main control substrate configured to cause the display panel to display the image; a control housing attached to the second attaching face of the display housing to cover at least the main control substrate together with the display housing; and a supporting base attached to the display housing and configured to support the display device body at a predetermined angle, wherein the supporting base further includes a base member, a pair of arms, and a reinforcing member; the reinforcing member is formed to connect the pair of arms with each other on a rear side of the device; and the reinforcing member has a longer length in a direction perpendicular to longitudinal directions of the base member as the reinforcing member extends to the arms.

2. The display device of claim 1, wherein the display housing has projecting parts projecting from the second attaching face to the side opposite from the display panel, and wherein each of the projecting parts is formed with a supporting base attaching portion to which the supporting base is attached.

3. The display device of claim 2, wherein each of the projecting parts projects from an end part of the second attaching face.

4. The display device of claim 3, wherein a notched portion through which the projecting part of the display housing is inserted is formed in the control housing to be located at a position in agreement with the projecting part.

5. The display device of claim 1, wherein a display panel substrate is disposed in the display housing, and wherein the display panel substrate performs a control regarding hardware of the display panel.

6. The display device of claim 1, wherein a part of the supporting base attached to the display housing is located outside the display housing.

7. A method of manufacturing display devices, comprising: attaching a display panel to a first attaching face of a display housing to cover a part of the display panel, the display panel configured to display an image; attaching a control housing to a second attaching face to cover, with the display housing and the control housing, a main control substrate configured to cause the display panel to display the image, the second attaching face located on the opposite side from the first attaching face; and attaching a supporting base to the display housing to support the display housing, and the display panel and the control housing attached to the display housing, at a predetermined angle, wherein the supporting base further includes a base member, a pair of arms, and a reinforcing member; the reinforcing member is formed to connect the pair of arms with each other on a rear side of the device; and the reinforcing member has a longer length in a direction perpendicular to longitudinal directions of the base member as the reinforcing member extends to the arms.

8. The method of manufacturing display devices of claim 7, wherein the display panel and the display housing used in the attaching the display panel, the attaching the main control substrate, and the attaching the supporting base are applicable to a different shape of control housing.

* * * * *